O. RUDE.
COUPLING DEVICE.
APPLICATION FILED APR. 16, 1908.
919,469.
Patented Apr. 27, 1909.
2 SHEETS—SHEET 1.
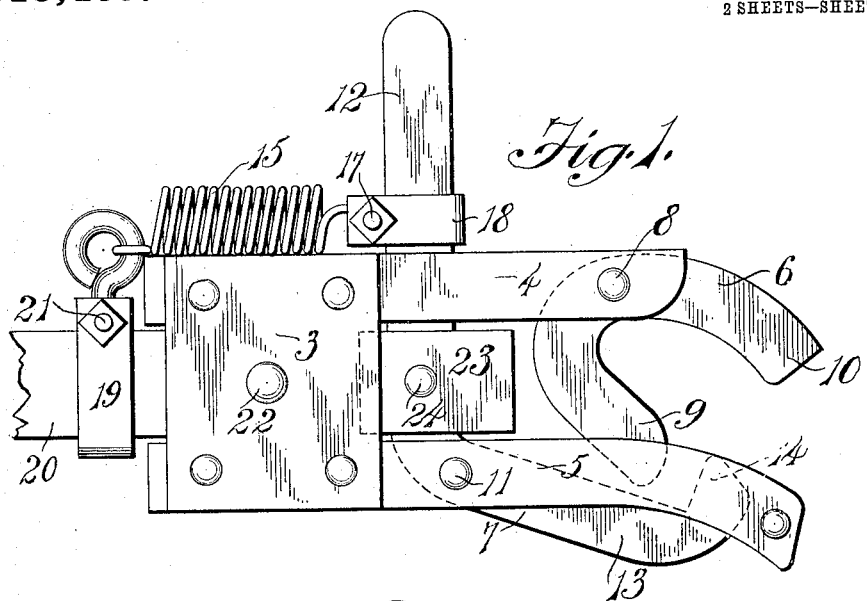
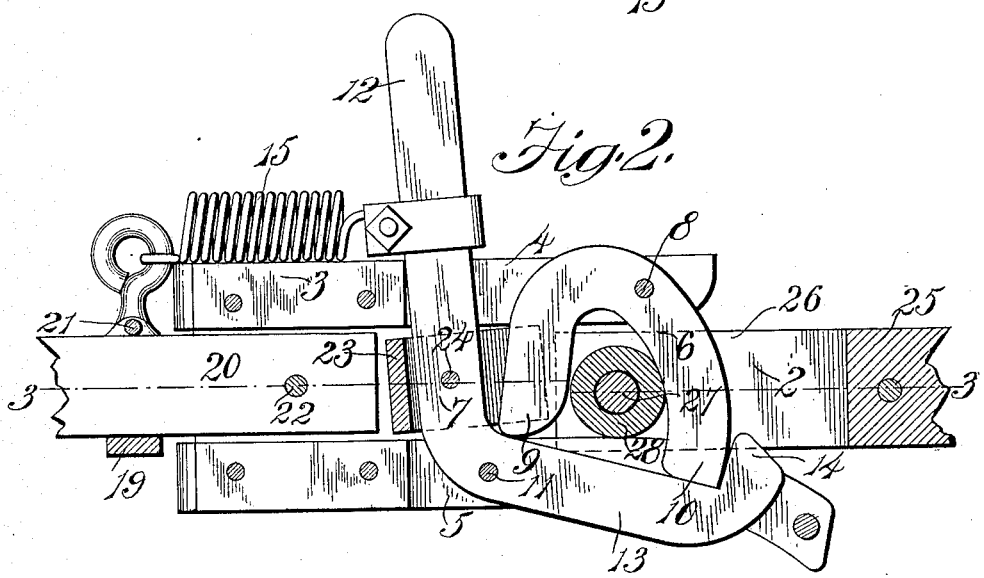
Witnesses
Rose S. Johnson
L. O. Little
Inventor
OSCAR RUDE
By Watson E. Coleman
Attorney

O. RUDE.
COUPLING DEVICE.
APPLICATION FILED APR. 16, 1908.

919,469.

Patented Apr. 27, 1909.
2 SHEETS—SHEET 2.

Witnesses
Rose S Johnson
L. O. Little

Inventor
OSCAR RUDE
By Watson E. Coleman
Attorney

UNITED STATES PATENT OFFICE.

OSCAR RUDE, OF BURKE, WISCONSIN.

COUPLING DEVICE.

No. 919,469.   Specification of Letters Patent.   Patented April 27, 1909.

Application filed April 16, 1908. Serial No. 427,448.

*To all whom it may concern:*

Be it known that I, OSCAR RUDE, a citizen of the United States, residing at Burke, in the county of Dane and State of Wisconsin, have invented certain new and useful Improvements in Coupling Devices, of which the following is a specification, reference being had to the accompanying drawings.

My invention relates to improvements in coupling devices and more particularly one especially adapted for connecting a traction engine to its load, but which may be used for analogous purposes.

The object of the invention is to provide a coupling device of this character which will be simple, strong, durable and comparatively inexpensive in construction and by means of which a traction engine may be quickly and easily connected to and disconnected from the machine, vehicle, or other load which it is to haul.

With the above and other objects in view, the invention consists of the novel features of construction and the combination and arrangement of parts hereinafter fully described and claimed, and illustrated in the accompanying drawings, in which—

Figure 3:
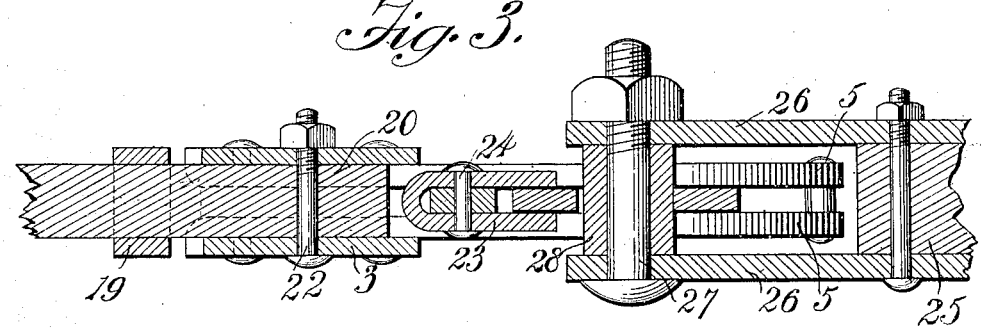
Figure 4:
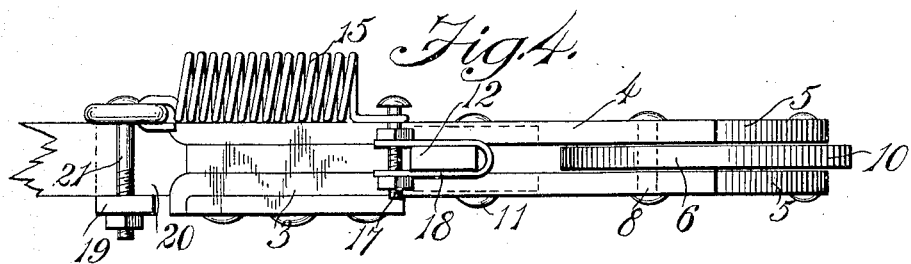
Figure 5:
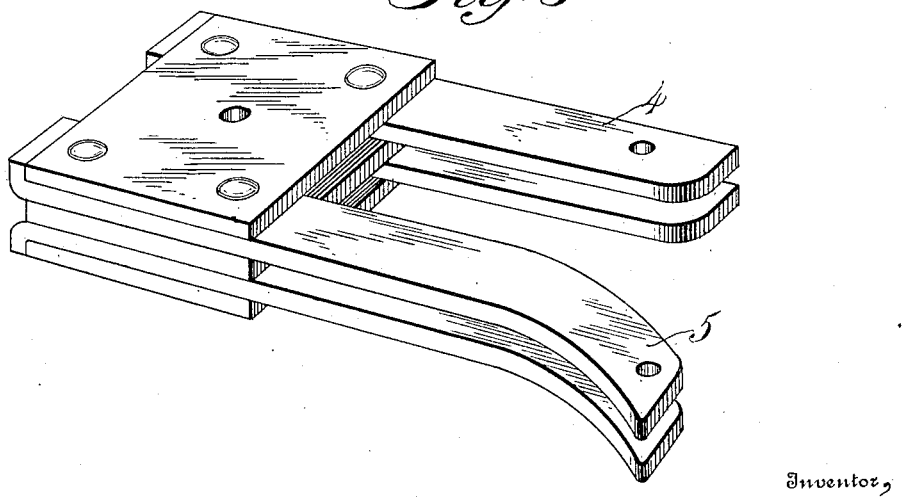

Figure 1 is a side elevation of my improved coupling device showing its hook member in open position; Fig. 2 is a vertical longitudinal section showing the device in its closed position and a link member engaged with it; Fig. 3 is a horizontal sectional view taken on the plane indicated by the line 3—3 in Fig. 2;
Fig. 4 is a plan view of the coupling device; and Fig. 5 is a detail perspective of the body of the coupling device.

In the drawings 1 denotes my improved coupling device which is in the form of a hook member and adapted to engage a link member 2 of any suitable form and construction. The member or device 1 comprises a body 3 having upper and lower arms 4, 5 which are spaced apart and slotted or divided longitudinally, said arms being adapted to receive the link member 2 between them, and the spaced sections or members of each arm being adapted to receive a retaining hook 6 and a combined operating and locking lever 7.
The lower arm 5 of the body 3 is preferably curved or inclined downwardly to provide a flaring entrance to the opening or space between the two arms and permit of the ready insertion of the link member 2. Said retaining hook or member 6 is substantially U-shaped and is mounted between the spaced sections of the upper arm 4 upon a transverse pivot 8. The latter passes through the closed portion of the hook 6 so that its two arms 9, 10 hang downwardly and are adapted to swing in a longitudinal plane between the spaced sections of the lower arm 5 of the body.

The lever 7 is angular or in the form of a bell crank and is pivoted at its angle on a transverse pin 11 in the inner portion of the lower arm 5. The upper end 12 of the lever is adapted to provide an operating handle and extends through the arm 4 in which it swings. The lower end 13 of the lever is inclined downwardly and forwardly and extends into the lower arm 5, its extremity being notched or bent to provide a shoulder or hook portion 14 adapted to co-act with the end 10 of the hook 6. The handle end 12 of the lever is actuated in a rearward direction by a spring 15 which supports the forward end 13 of said lever in an elevated position so that when the hook 6 is closed its outer square end 10 will be engaged by the shoulder or hook portion 14 on the end 13 of the lever to lock the link member 2 between the arms 4 and 5 of the body of the device. Said end 13 of the lever is also adapted to be engaged by the inner end or arm 9 of the hook 6 when the latter is in its open position so that the other arm or end 10 of said hook will be supported above the curved outer end of the arm 5 of the body to permit of the ready insertion of the coupling of the link member 2.
It will be seen that when the hook is in its open position, as shown in Fig. 1, and the link member 2 is inserted beneath the arm 10 of the hook and between the arms 4, 5 of the body of the coupling device or member 1, said link will engage the inclined inner edge of the end 9 of the hook 6 and swing it inwardly or rearwardly, thereby causing its lower end to oscillate the lever against the tension of its spring 15. This movement of the hook causes its outer arm 10 to swing downwardly across the space between the arms 4, 5 and between the spaced sections of the lower arm 5 of the body so that the instant the inner end 9 of the hook leaves the upper edge of the end 13 of the lever, the latter will spring outwardly and its hook or shoulder 14 will spring in advance of the lower extremity of the end or arm 10 of the hook and thereby lock said end or arm in its closed position to retain the link member between the arms 4, 5. It will therefore be seen that the device is self locking when the link member is pushed into it and that the inner arm or end 9 of the hook 6 not only serves as a means for supporting the other arm or end of the hook elevated to receive the link member but also as a means for actuating the lever to first depress and then release its outer end during the coupling operation.

The spring 15 for actuating the lever is preferably in the form of a coil having one of its ends engaged with the clamping bolt 17 of a U-shaped clip 18 arranged upon the upper end of the lever 7. The other end of said spring is engaged with a hook upon one arm of a similar shaped clip 19 arranged upon the draw bar 20 of a traction engine or any other vehicle or body and secured thereon by a clamping bolt 21. As shown, the draw bar 20 projects into the body portion 3 of the coupling device and is loosely secured by a transverse pivot bolt 22, which latter thus serves to detachably secure the coupling device to a traction engine or other object.

23 denotes a combined stop and guide arranged upon the end 12 of the lever 7 between the arms 4, 5 of the body and in the form of a U-shaped plate secured by a transverse pin 24. The top and bottom edges of said plate are adapted to engage the opposing edges of the arms 4, 5 to limit the swinging movement of the lever and the spaced ends of the same are adapted to receive the inner end 9 of the hook 6 between them to guide the latter in its swinging movement.

While the body 3 of the coupling may be of any suitable form and construction I preferably make it of two rectangular side plates between which are arranged upper and lower pairs of forwardly projecting bars and centrally disposed spacing plates. Said bars form the upper and lower arms 4, 5 of the body and they are spaced apart by said centrally arranged plates. Transverse rivets secure the several parts of the body together and the rear ends of said bars are bent outwardly at right angles to engage the rear edges of the side plates to relieve said rivets of strain.

The link member 2, illustrated in Figs. 2 and 3 of the drawings, comprises a bar 25 which may be the draft bar or tongue of a threshing machine, vehicle or any other object which forms the load for the traction engine. On the opposite sides of the bar 25 are bolted forwardly projecting strips 26 and between the ends of the latter is arranged a transverse bolt 27 which may contain a wear sleeve 28 adapted to enter between the arms 4, 5 of the body of the coupling device. Said sleeve 28 is preferably in the form of a cylindrical roller, as shown.

From the foregoing it will be seen that my improved coupling device is simple, strong, durable and inexpensive in construction and quick and effective in operation. Owing to its peculiar construction it will be seen that the two members may be quickly engaged and locked by simply shoving the link member into the open hook member and that the two members may be as readily separated by simply swinging the handle 12 of the lever outwardly and then pulling said members apart.

While I have shown and described in detail the preferred embodiment of the invention it will be understood that I do not wish to be limited to the precise construction set forth and that various changes in the form, proportion and minor details of construction may be resorted to without departing from the spirit or sacrificing any of the advantages of the invention.

Having thus described my invention what I claim is:

1. A coupling device comprising a body having spaced arms, a retaining hook of substantially U-form pivoted to one of said arms and having inner and outer ends and a spring actuated operating lever having a shouldered end adapted to engage the outer end of the hook to retain the latter in its closed position, the inner end of said hook being adapted to engage and actuate the lever in the closing operation of the device.

2. A coupling device comprising a body having spaced arms, a retaining hook of substantially U-form pivoted to one of said arms and having inner and outer ends and a spring actuated operating lever having a shouldered end adapted to engage the outer end of the hook to retain the latter in its closed position, the inner end of said hook being adapted to engage said end of the lever to operate it against the tension of its actuating spring during the closing operation of the device and to release it to permit its shoulder to engage said outer end of the hook and retain the latter in its closed position.

3. A coupling device comprising a body having upper and lower arms composed of spaced sections, a substantially U-shaped retaining hook pivoted at its closed portion in the upper arm and having inner and outer ends depending and adapted to swing between the sections of the lower arm, an angular lever arranged between the sections of the two arms and pivoted at its angle in the lower arm, the upper end of the lever forming an operating handle and the lower end being shouldered to engage the outer end of said hook, the inner end of said hook being adapted to engage said lower arm of the lever to actuate it, and a spring for actuating said lever in one direction.

4. A coupling device comprising a body having a socketed portion adapted to receive a draw bar and upper and lower arms provided with spaced sections, a draw bar secured in said body, a retaining hook of U-form pivoted in the upper arm and having inner and outer depending ends, an angular lever pivoted at its angle in the lower arm and having an upwardly projecting end to provide a handle and a downwardly and forwardly projecting end formed with a shoulder to engage the outer end of the hook, the inner end of the latter being adapted to engage and actuate said lower end of the lever, clips upon said lever and said draw bar and a coil spring arranged between said clips.

5. A coupling device comprising a body provided with spaced arms and consisting of outer side plates and spaced bars which form the arms and are secured between said side plates, a retaining hook pivoted between the spaced bars of one arm and a spring actuated locking lever pivoted between the spaced bars of the other arm and adapted to engage said hook.

6. A coupling device comprising a body provided with spaced arms and consisting of outer side plates and spaced bars which form the arms and are secured between said side plates, a draw bar secured in the body, a retaining hook pivoted between the bars of one arm, a locking lever pivoted between the bars of the other arm and adapted to engage said hook, clips upon said lever and said draw bar and a coil spring between said clips.

In testimony whereof I hereunto affix my signature in the presence of two witnesses.

OSCAR RUDE.

Witnesses:
 STEPHEN W. GILMAN,
 WINIFRED L. TIMLIN.